Patented Jan. 27, 1948

2,435,056

UNITED STATES PATENT OFFICE 2,435,056

METHOD OF APPLYING PLANT RESPONSE SUBSTANCES

Harold A. Schomer, Beltsville, Md., and Charles L. Hamner, Geneva, N. Y., assignors to the United States of America, as represented by the Secretary of Agriculture No Drawing. Application January 16, 1945, Serial No. 573,095

13 Claims. (Cl. 47—58)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to plant response substances, particularly plant growth regulants such as naphthoxyacetic acid, indole butyric acid, naphthalene acetic acid, alpha-naphthyl acetamide, 4-chloro-phenoxy acetic acid, ether extracts of plants, and so forth, and particularly to a method of applying such substances to plants, such as hemp, roses, apples, tomatoes, and so forth.

The invention has among its objects the treatment of plants so as to produce improved plant responses, such as increased and early setting, early growth, early maturing of fruit, the production of seedless fruit, and so forth. Other objects will be apparent from the following description.

In the prior art, various methods have been employed in applying plant response substances, but these methods are each objectionable for various reasons. For example, the method of applying a plant response substance in the form of a paste is an extremely tedious and drawn out process and is impracticable in cases where large numbers of plants must be treated. It has the further disadvantage in that there is no way of knowing how much of the response substance is in solution in the paste, thus, rendering duplicate or control treatments difficult, if not impossible.

The ordinary spraying method is also objectionable in that too much solvent, such as alcohol, is required to get the response substance into solution, many of such solvents being expensive and toxic to plants. Also, each plant must be sprayed individually, since the particle size of sprays is too large to diffuse uniformly in the air. Furthermore, since the amount of spray each plant receives is difficult to measure, the duplication of treatments is also difficult.

The method of dipping the plant in aqueous solutions of plant response substances is also objectionable. It is impracticable in cases where the plants are large or are growing in a fixed location. In other cases, as in the treatment of bunch grapes, dipping is objectionable because of resulting appearances. This method is also objectionable in that too much solvent is required to put the plant response substance into solution.

The method of volatilization by heat involves placing the plant response substance directly on a hot surface, the heat volatilizing the substances into particles of unknown size and structure. This method is objectionable also in that the volatile products produced are of unknown size and structure, much of the material is decomposed by the heat, the resulting concentration of response substance in the atmosphere is also unknown, and the apparatus necessary for the method is cumbersome.

In general, our invention comprises the application of plant response substances in aerosol form to the surfaces of plants. This method obviates the deficiencies of the prior art in that it is rapid and easy to operate, economical and not tedious. It involves only a small amount of labor, is employable over large groups of plants at one time, and permits duplication of treatments with a high degree of accuracy. Solvents can be used that are not toxic to plants and no change in appearance of plants results. In fact, the solvent does not even contact the plants in liquid form. Moreover, no breakdown of the structure of the plant response substances occurs by the use of the method of this invention. The exact amount of the plant response substance may be delivered to any size enclosure and the particles disperse themselves uniformly as tiny colloidal particles throughout the enclosure.

A preferred manner of applying the aerosol is by the method disclosed in United States Patent No. 2,321,023, in accordance with which the plant response substance or substances are dissolved in a low-boiling solvent and the resulting solution atomized into the air surrounding the plants by means of its own vapor pressure. The solution is kept in a container having a control valve for release of the liquid in the form of a spray at any desired instant. A mutual solvent of high-boiling point may be employed to increase the effectiveness of the response substances by retaining them in solution in the colloidal particles that are produced when the solution is released in atomized form and subsequently broken up further by the violent boiling of the solvent.

The following examples illustrate how the invention is applied in practice.

Example I

The aerosol solution was prepared by dissolving one gram naphthoxyacetic acid in 10 grams of cyclohexanone as the high-boiling-point mutual solvent, and this solution, in turn, being dissolved in 89 grams of dimethyl ether as the volatile solvent. Tomato plants with their first blossom clusters were then placed in a room into which the aerosol, comprising naphthoxyacetic acid as the response substance, was introduced at the rate of 240 milligrams per 1000 cubic feet of air. After about 2 hours, the plants were removed to a greenhouse. Three days later, visible fruits were observed on the treated plants, while none were visible on untreated control plants. After about 9 days, the number of visible fruits per plant was 3 for the treated and 0.5 for the controls, a ratio of 6 to 1. The average diameter of the fruits after 36 days was 2.9 inches for the treated plants, and 2.1 inches for the control. The fruits of the treated plants were seedless.

*Example II*

The same as Example I, except that the plant response substance was naphthalene acetic acid.

*Example III*

The same as Example I, except that the plant response substance was alpha-naphthyl acetamide.

*Example IV*

The same as Example I, except that the plant response substance was 4-chloro-phenoxy acetic acid.

*Example V*

The same as Example I, except that the plant response substance was an ether extract of a plant.

*Example VI*

The same as Example I, except that in this case, the aerosol contained a mixture of naphthoxyacetic acid, indole butyric acid, naphthalene acetic acid, and alpha-naphthyl acetamide, each ¼% in solution, as the applied plant response substances.

In the foregoing examples the results obtained are very similar to those shown under Example I.

This aerosol method of applying plant response substances also has been used on a number of fruits and vegetables, among them the following, with results as indicated:

*Apples.*—Prevented fruit drop and hastened maturity of fruit, more than with other methods previously referred to.

*Small fruits.*—Increased the set of small fruits, such as blackberry and raspberry. Also was effective in producing difficult crosses where other methods of application of growth substances had failed, i. e., Hailsham (tetraploid) raspberry on El Dorado blackberry #459 (tetraploid).

*Cucumbers.*—Increased set of fruits, hastened growth, and produced seedless fruit.

*Forest tree seedlings.*—Inhibited bud growth, thus prolonging the transplanting period. This method was more effective than other methods employed.

*Potatoes.*—Prevented sprouting; which was important applications to commercial storage.

It is to be understood that the proportions of the various ingredients used to prepare the aerosol, as shown specifically in Example I, may be varied within wide limits.

This method of applying plant response substances in aerosol form also may be used in unconfined areas, as, for example, in the fields, as a spray.

Having thus described our invention, what is claimed is:

1. A method of applying a plant growth regulant to plants comprising dispersing the plant growth regulant in aerosol form in the ambient air of the plants.

2. A method of claim 1, wherein the plant growth regulant is naphthoxyacetic acid.

3. A method of claim 1, wherein the plant growth regulant is indole butyric acid.

4. A method of claim 1, wherein the plant growth regulant is naphthalene acetic acid.

5. A method of claim 1, wherein the plant growth regulant is alpha-naphthyl acetamide.

6. A method of claim 1, wherein the plant growth regulant is an ether extract of a plant.

7. A method of claim 1, wherein the plant growth regulant consists of equal parts of naphthoxy acetic acid, indole butyric acid, naphthalene acetic acid, and alpha-naphthyl acetamide.

8. The method of applying plant growth regulants to plants comprising subjecting the plants to an atmosphere containing the regulants in aerosol form.

9. The method of applying plant growth regulants to plants comprising subjecting the plants to an atmosphere containing the regulants in aerosol form and maintaining the plants in the atmosphere until aerosol particles of the regulants settle on the plants.

10. The method of treating a plant with a plant growth regulant comprising contacting the plant with the plant growth regulant in aerosol form.

11. The method of producing a new plant variety comprising hybridizing different species of berries under the influence of a plant growth regulant in aerosol form.

12. The method of producing a new plant variety comprising hybridizing a species of raspberry with a species of blackberry under the influence of a plant growth regulant in aerosol form.

13. The method of producing a new plant variety comprising hybridizing a Hailsham tetraploid raspberry with an El Dorado tetraploid blackberry under the influence of a plant growth regulant in aerosol form.

HAROLD A. SCHOMER.
CHARLES L. HAMNER.

REFERENCES CITED

The following references are of record in the file of this patent:

UNITED STATES PATENTS

| Number | Name | Date |
| --- | --- | --- |
| 2,248,400 | Avery | July 8, 1941 |
| 2,321,023 | Goodhue | June 8, 1943 |

FOREIGN PATENTS

| Number | Country | Date |
| --- | --- | --- |
| 14,309 | Australia | 1923 |

OTHER REFERENCES

Zimmerman, "Present Status of Plant Hormones," Ind. Eng. Chem., vol. 35, pp. 596–601 (May 1943).

Mitchell, "Pedigreed Pine . . .," Science, vol. 96, No. 2503, pp. 559 and 560 (Dec. 18, 1942).